(12) United States Patent
Miller et al.

(10) Patent No.: US 8,399,150 B2
(45) Date of Patent: Mar. 19, 2013

(54) INTEGRATED FUEL CELL ASSEMBLY AND METHOD OF MAKING

(75) Inventors: Daniel P. Miller, Victor, NY (US);
Matthew J. Beutel, Webster, NY (US);
Sumeet Bhargava, Rochester, NY (US);
Courtney E. Reich, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 12/821,701

(22) Filed: Jun. 23, 2010

(65) Prior Publication Data
US 2011/0318667 A1  Dec. 29, 2011

(51) Int. Cl.
*H01M 2/08* (2006.01)
*H01M 4/02* (2006.01)
*H01M 8/10* (2006.01)

(52) U.S. Cl. ........ 429/508; 429/509; 429/463; 429/534; 429/480; 429/482

(58) Field of Classification Search .................. 429/480, 429/481, 482, 483, 492, 507, 508, 509, 518, 429/534, 463, 457, 460
See application file for complete search history.

(56) References Cited

U.S. PATENT DOCUMENTS

| | | | |
|---|---|---|---|
| 2005/0016729 A1* | 1/2005 | Savage | 166/302 |
| 2006/0073385 A1* | 4/2006 | Andrin et al. | 429/185 |
| 2010/0062320 A1 | 3/2010 | Dammar et al. | |
| 2010/0112405 A1* | 5/2010 | Peters et al. | 429/30 |
| 2011/0281195 A1* | 11/2011 | Fuller et al. | 429/467 |

* cited by examiner

*Primary Examiner* — Raymond Alejandro
(74) *Attorney, Agent, or Firm* — Dinsmore & Shohl LLP

(57) ABSTRACT

An integrated fuel cell assembly is described. The integrated fuel cell assembly includes a polymer membrane; an anode electrode and a cathode electrode on opposite sides of the polymer membrane; a pair of gas diffusion media on opposite sides of the polymer membrane, the gas diffusion media comprising a microporous layer and a gas diffusion layer, the anode electrode and the cathode electrode positioned between the polymer membrane and the pair of gas diffusion media; a subgasket positioned around a perimeter of one of the gas diffusion media, the subgasket defining an active area inside the perimeter, the subgasket having a layer of thermally activated adhesive thereon; and a bipolar plate sealed to the subgasket by the layer of thermally activated adhesive. Methods of making the integrated fuel cell assembly and assembling fuel cell stacks are also described.

10 Claims, 5 Drawing Sheets

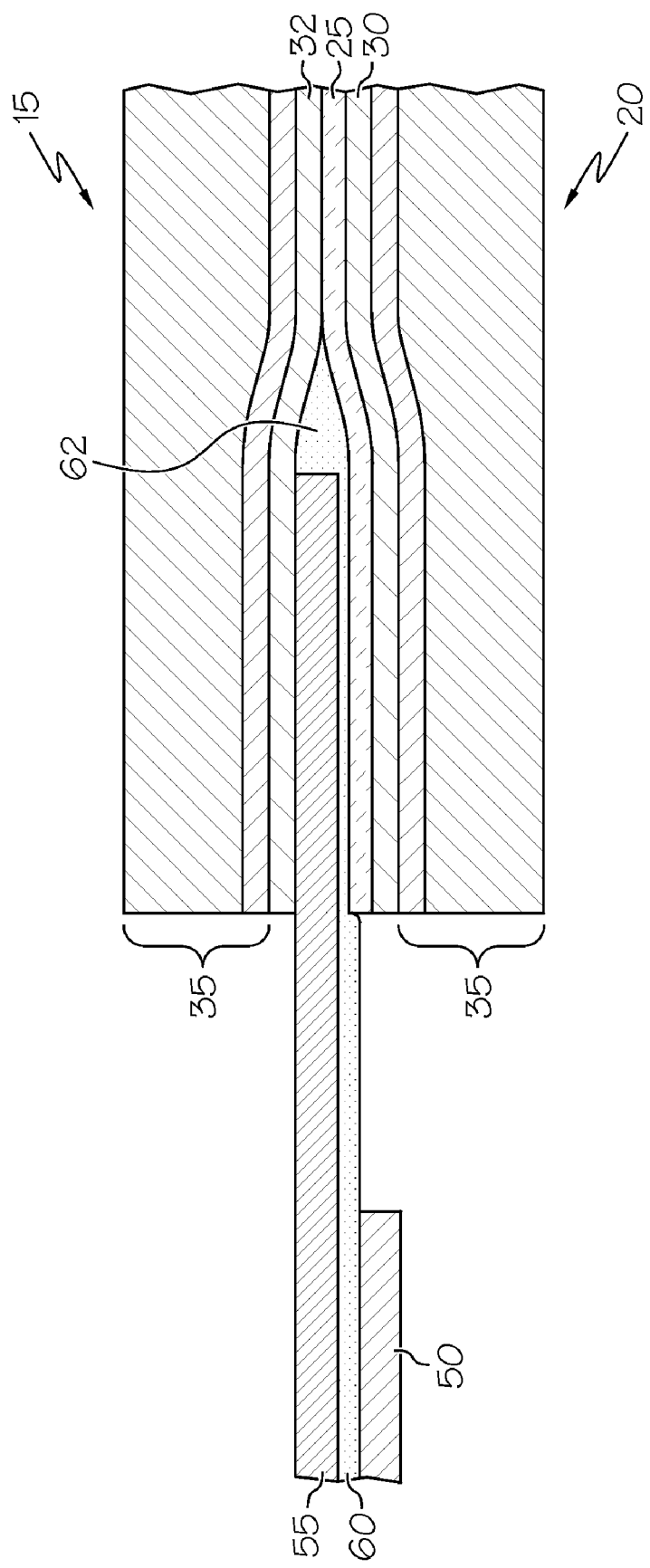

INTEGRATED FUEL CELL ASSEMBLY AND METHOD OF MAKING

FIELD OF THE INVENTION

The present invention relates generally to fuel cells, and more particularly to integrated fuel cell assemblies, and to methods of making them.

BACKGROUND OF THE INVENTION

Electrochemical conversion cells, commonly referred to as fuel cells, produce electrical energy by processing first and second reactants, e.g., through oxidation and reduction of hydrogen and oxygen. By way of illustration and not limitation, a typical polymer electrolyte fuel cell comprises a polymer membrane (e.g., a proton exchange membrane (PEM)) that is positioned between a pair of catalyst layers and a pair of gas diffusion media (GDM). The GDM typically includes a gas diffusion layer and a microporous layer (MPL). The cathode electrode layers can be part of the PEM (catalyst coated membrane (CCM)) or as a layer on the DM (catalyst coated diffusion media (CCDM)). A cathode plate and an anode plate (or bipolar plates BPP) are positioned at the outermost sides adjacent the gas diffusion media layers, and the preceding components are tightly compressed to form the cell unit.

The voltage provided by a single cell unit is typically too small for useful applications. Accordingly, large numbers of cells, typically about 200 up to about 300 or more, are arranged and connected in electrical series consecutively in a "stack" to increase the voltage electrical output of the electrochemical conversion assembly or fuel cell. Each cell typically includes a bipolar plate assembly (BPP) and a unitized electrode assembly (UEA) (GDM/Cat/PEM/Cat/GDM). The components must be assembled into the stack, resulting in about 400 to about 600 or more individual components to be assembled.

The UEA includes a subgasket material which acts to separate the anode and cathode flow streams and provides for electrical insulation between the anode and cathode plates of the fuel cell. There is a desire to reduce the thickness of the subgasket material to reduce costs and decrease membrane stress at the subgasket edge where the anode and cathode GDMs overlap the subgasket. Some current UEAs are made with thin film subgaskets, in the range of 1 to 2 mil thick, which are mechanically weak and can be difficult to handle. When the UEA with a thin subgasket is assembled into a fuel cell stack as a discrete component it can be difficult to obtain good positional alignment of the trimmed UEA profile features to the BPP features in the fuel cell stack assembly.

A seal is disposed around the perimeter of the cell and also between the reactant streams. The subgasket material of the UEA needs to be sealed between adjacent plate assemblies of the fuel cell as the subgasket film materials do not provide adequate sealing integrity to the plate materials on their own. Elastomer seal material typically provides this function. The seal material can be equally disposed on each side of the subgasket film, or the majority of the elastomer can exist on one side while the other side has only a thin layer of seal material (microseal). In some cases, the UEA is sealed to the BPP using a microseal of pressure sensitive adhesives (PSAs), which require a special release liner to prevent undesired or premature adhesion. It is desirable for the subgasket film material to extend to or slightly past the plate edges to act as an electrical insulator between the anode and cathode plates of a cell. PSAs present on these overhanging subgaskets can pose additional stack assembly issues as the adhesives are exposed and active in these areas where adhesive function is not necessarily desired.

Therefore there is a need for a cell assembly which is easy to handle and subsequently assemble into a stack, while also maintaining good dimensional alignment between all of the components and features that make up the stack assembly.

SUMMARY OF THE INVENTION

The present invention meets this need. One aspect is an integrated fuel cell assembly. The integrated fuel cell assembly includes a polymer membrane; an anode electrode and a cathode electrode on opposite sides of the polymer membrane; a pair of gas diffusion media on opposite sides of the polymer membrane, the gas diffusion media comprising a microporous layer and a gas diffusion layer, the anode electrode and the cathode electrode positioned between the polymer membrane and the pair of gas diffusion media; a subgasket positioned around a perimeter of one of the gas diffusion media, the subgasket defining an active area inside the perimeter, the subgasket having a layer of thermally activated adhesive thereon; and a bipolar plate sealed to the subgasket by the layer of thermally activated adhesive to form a gas tight seal, the bipolar plate having an anode side and a cathode side.

Another aspect of the invention is a method of making an integrated fuel cell assembly. The method includes providing a unitized electrode assembly comprising: a polymer membrane; an anode electrode layer and a cathode electrode layer on opposite sides of the polymer membrane; a pair of gas diffusion media on opposite sides of the polymer membrane, the gas diffusion media comprising a microporous layer and a gas diffusion layer, the anode electrode and the cathode electrode positioned between the polymer membrane and the pair of gas diffusion media; and a subgasket positioned around a perimeter of one of the gas diffusion media, the subgasket defining an active area inside the perimeter, the subgasket having a layer of thermally activated adhesive to the subgasket; placing a bipolar plate on the layer of thermally activated adhesive, the bipolar plate having an anode side and a cathode side; and heating the thermally activated adhesive to seal the bipolar plate to the unitized electrode assembly forming a gas tight seal.

Another aspect of the invention is a method of assembling a fuel cell stack. The method includes providing a plurality of integrated fuel cell assemblies comprising: a polymer membrane; an anode electrode and a cathode electrode on opposite sides of the polymer membrane; a pair of gas diffusion media on opposite sides of the polymer membrane, the gas diffusion media comprising a microporous layer and a gas diffusion layer, the anode and the cathode positioned between the polymer membrane and the pair of gas diffusion media; a subgasket positioned around a perimeter of one of the gas diffusion media, the subgasket defining an active area inside the perimeter, the subgasket having a layer of thermally activated adhesive thereon; and a bipolar plate sealed to the subgasket by the layer of thermally activated adhesive to form a gas tight seal, the bipolar plate having an anode side and a cathode side; stacking the plurality of integrated fuel cell assemblies so that the bipolar plate in one integrated fuel assembly is adjacent to one of the gas diffusion media of another integrated fuel cell assembly; and compressing the plurality of integrated fuel cell assemblies.

BRIEF DESCRIPTION OF THE DRAWINGS

FIGS. 2A-B are cross-sectional views of a unitized electrode assembly.

DETAILED DESCRIPTION OF THE INVENTION

Figure 1:
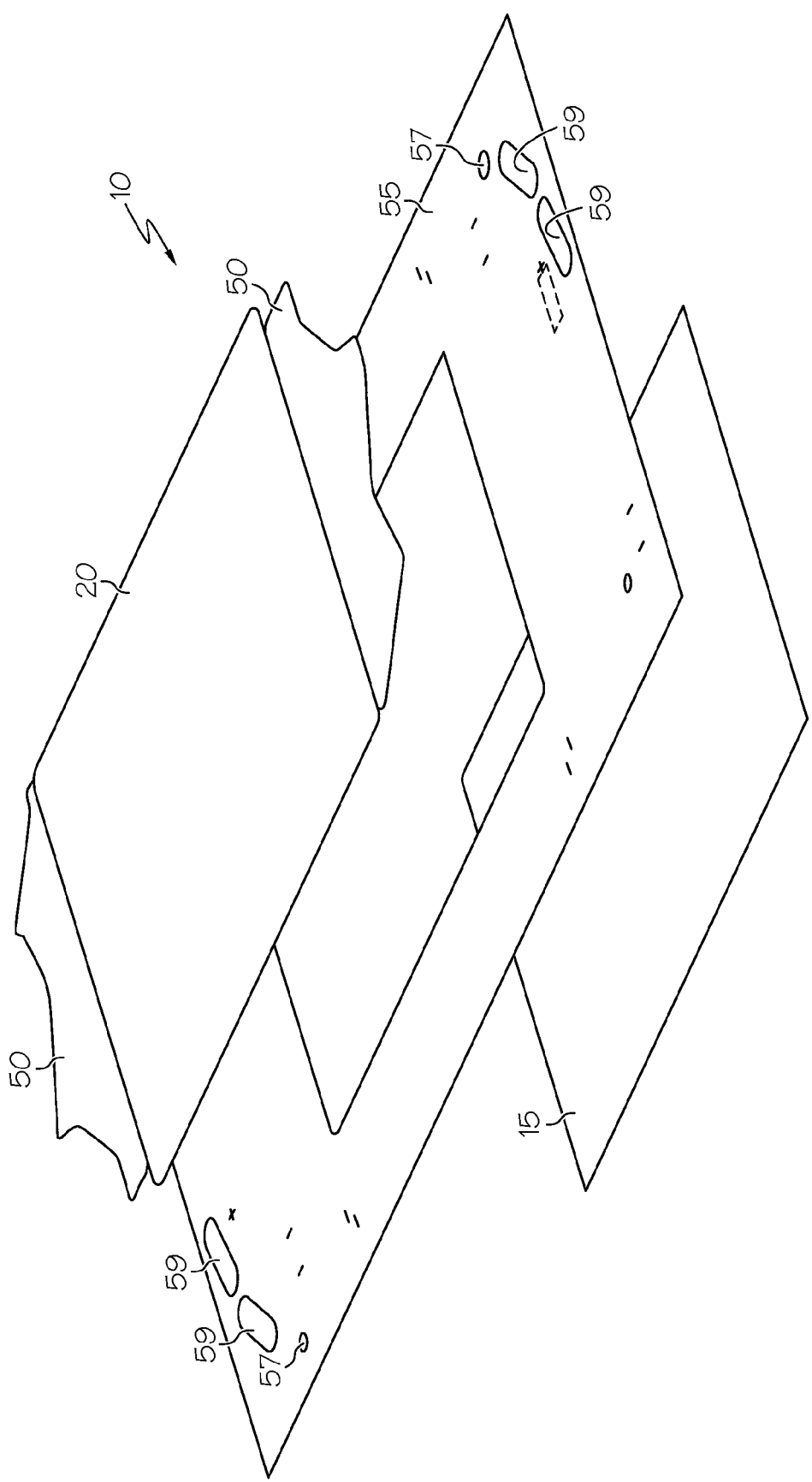
FIG. 1 is an exploded view of a unitized electrode assembly.
Figure 2A:
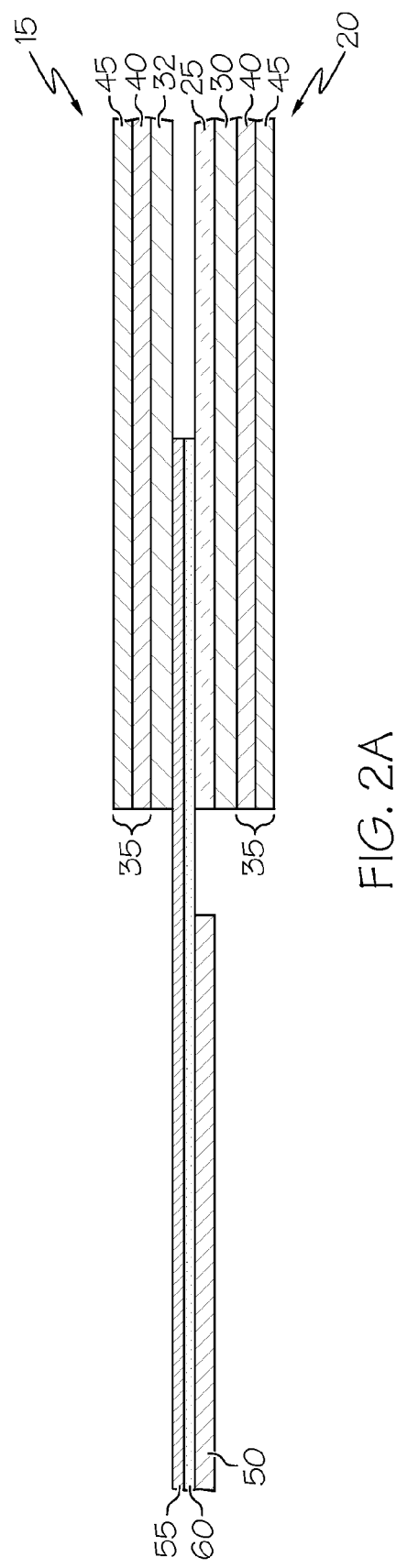

FIGS. 1, 2A and 2B illustrate a unitized electrode assembly (UEA) 10. The UEA 10 includes an anode 15 and a cathode 20 on opposite sides of a proton exchange membrane (PEM) 25. In this embodiment, the anode 15 and cathode 20 are catalyst coated diffusion media (CCDM) CCDM, with a cathode electrode layer 30 and an anode electrode layer 32 on the gas diffusion media (GDM) GDM 35, which includes a microporous layer (MPL) 40 and gas diffusion layer 45. The cathode electrode layer 30 and the anode electrode layer 32 are on the MPL 40. However, the catalyst coated membrane (CCM) (in which the electrode layer is on the PEM) could also be used, if desired.

There is a subgasket 55 between the anode 15 and cathode 20. The subgasket 55 surrounds the perimeter of the active area of the anode 15 and cathode 20 (similar to a picture frame). The subgasket can be made of any polymer film that meets fuel cell requirements (e.g., having appropriate mechanical properties based on operating temperatures, pressures, and thicknesses, being an electrical insulator or have surfaces that are electrically nonconductive, and desirably being inexpensive and easily manufacturable). Suitable materials include, but are not limited to, polyethylene naphthalate (PEN), polyimide (PI), polyether-etherketone (PEEK) etc.

The subgasket 55 can optionally include one or more alignment holes 57 which will locate the UEA relative to alignment features of the bipolar plate assembly (BPP). Other types of alignment features as are known in the art can also be used. There can also be clearance holes 59 for various plate features, if desired.

The subgasket 55 has a layer of thermally activated adhesive 60 on the side facing the cathode 20. Thermally activated adhesives do not require a release liner to prevent premature adhesion at ambient temperature. The thermally activated adhesive can be any adhesive that meets fuel cell requirements (e.g., operating temperatures between −30 and 100° C., pressures up to 300 kPa, compatible with an acidic membrane, hydrogen, air, and water, and being an electrical insulator). Suitable thermally activated adhesives include, but are not limited to, ethylene vinyl acetate (EVA), ethylene acrylic acid (EAA), polyamide, polyesters, polyolefins, polyurethanes, and combinations thereof.

The thermally activated adhesive 60 also bonds the PEM to the subgasket 55 to create a gas tight joint.

Reinforcing feed shims 50 are positioned on opposite ends of the cathode 20. The feed shims are used to provide structural support for the subgasket over the channel features in the feed region of the plate. There is typically an anode to cathode pressure bias that acts to drive the subgasket into the channels restricting flow and/or increasing pressure drop through the cell. It is desirable to keep the subgasket thin in the areas where the GDM overlaps it, while for the feed region a thick structurally sound material is required.

The thermally activated adhesive 60 bonds the feed shims 50 to the subgasket 55. The feed shims 50 can be the same size or they can be different depending on the design of the feed region. The feed shims are typically about the same size as the feed region, for example feed shims of about 50 to about 80 cm² are suitable. The feed shims are typically made of PEN, although other suitable materials could also be used.

Figure 3:
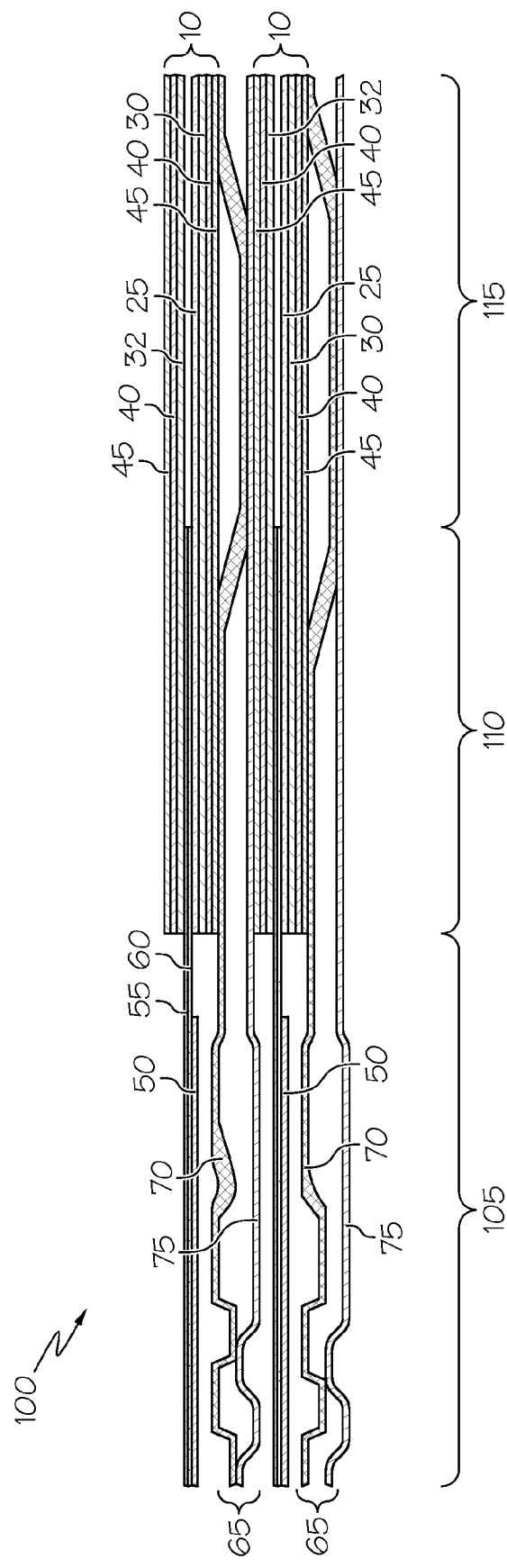
FIG. 3 is a cross-sectional view of a portion of a fuel cell incorporating a unitized electrode assembly.
Figure 4:
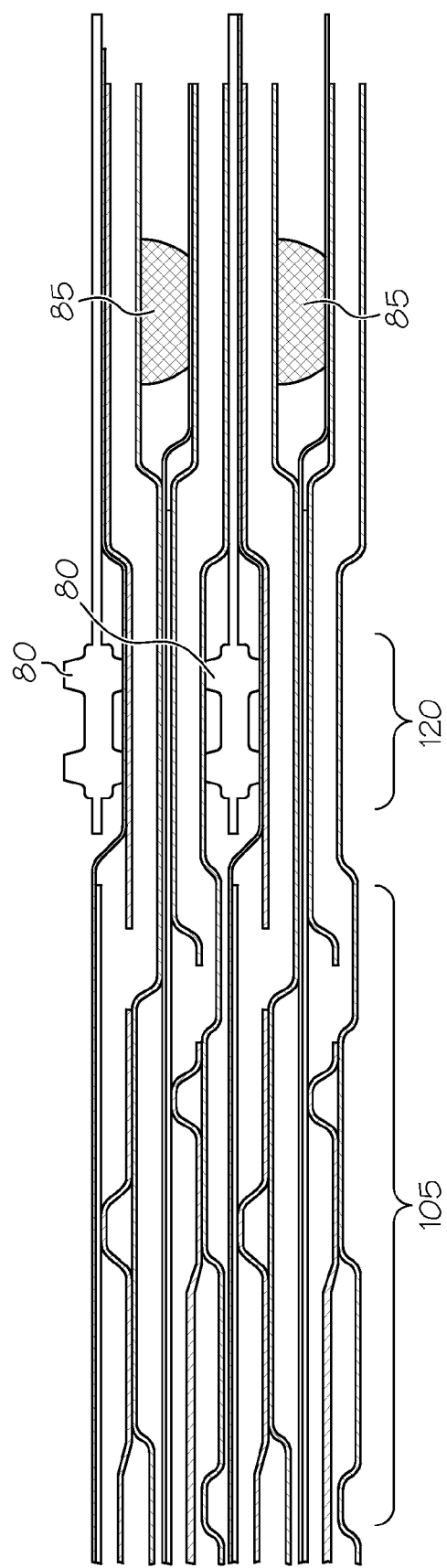
FIG. 4 is a cross-sectional view of another portion of the fuel cell of FIG. 3.

FIGS. 3-4 illustrate the integrated fuel cell assembly 100 which includes the UEA 10 and the BPP 65. The BPP 65 has a cathode plate 70 and an anode plate 75. The UEA 10 is bonded to the cathode plate 70 of the BPP 65 by the thermally activated adhesive 60. The thermally activated adhesive 60 forms a gas tight seal between the UEA 10 (subgasket 55) and the BPP 65. The thermally activated adhesive 60 maintains the UEA 10 and BPP 65 in proper alignment during further processing, such as adding header cutouts through the subgasket and trimming the subgasket to final size and fuel cell stack assembly.

The integrated fuel cell assembly 100 has four sections: the feed section 105, the active area edge section 110, and the active area section 115, and the seal area section 120.

The feed section 105 includes the BPP 65 with the cathode plate 70 and anode plate 75. The thermally activated adhesive 60 on the cathode side of the subgasket 55 locates the feed shim 50 to the cathode plate 70 of the BPP 65.

The active area edge section 110 includes the anode plate 75 and cathode plate 70 of the BPP 65. The UEA 10 in this section includes gas diffusion layer 45, MPL 40, cathode electrode 30, PEM 25, thermally activated adhesive 60, subgasket 55, anode electrode 32, MPL 40, and gas diffusion layer 45. This can be followed by additional integrated fuel cell assemblies.

The active area section 115 contains the same components as the active area edge section 110, except there is no subgasket 55 or thermally activated adhesive 60. In some cases, it may be desirable for the thermal adhesive, under temperature and pressure, to migrate past the edge of the subgasket window and slightly into the active area (~100-500 μm) providing a smooth transition between the edge of the subgasket and the point where the anode catalyst layer 32 contacts the PEM 25. This area without the thermal adhesive present would result in a tenting area formed by the subgasket thickness where there is no contact between the electrode and PEM for a CCDM and between the MPL and the electrode for a CCM. The tenting area is formed when the anode and cathode GDM/electrode/membrane are compressed from the outer surface of the gas diffusion layer (those in contact with the anode and cathode plates). The layers of the UEA are stiff enough to create a span over the thickness of the subgasket preventing the adjacent layers from contacting each other. This area 62 can be filled as the thermal adhesive migrates with applied pressure when the gas diffusion layer of the UEA is subjected to temperature and pressure, as shown in FIG. 2B. Such an arrangement is described in U.S. Publication 2010/0062320 A1, entitled Subgasket Window Edge Design Relief, published Mar. 11, 2010, which is incorporated herein by reference.

The seal area section 120 contains the anode plate 70, cathode plate 75, thermally activated adhesive 60, subgasket 55, seals 80 and 85, followed by another BPP 65, etc. Seals 80 and 85 are two types of elastomeric seals that could be used. Seal 80 is an example of a pre-molded seal. Seal 85 is formed by dispensing a seal material onto the BPP and curing it. Other types of seals could be used as are known to those of skill in the art, if desired.

The UEA 10 can be accurately aligned with the BPP 65 using alignment pins or other similar alignment mechanisms (not shown). A heated platen is compressed against the UEA 10 over the entire seal gland area. The heat activates the thermally activated adhesive which bonds the UEA 10 to the BPP 65. It forms a gas tight seal between the geometry of the cathode plate surface, and acts as a cathode seal. It can also act as a coolant and as an anode seal at the headers on the cathode plate. This allows the seal to be continuously coated on the subgasket rather than a pattern coating or printed microseal on the cathode plate or on the cathode side of the UEA 10. Because the UEA 10 is attached to the BPP 65, the subgasket 55 can be trimmed relative to the plate features independently of where the UEA is positioned relative to the BPP features for proper overhangs which acts a an electrical insulator between plates. Alternatively, the gas tight seal could be formed on the anode side of the plate, if desired.

By preassembling the cell components prior to assembling the cell stack, the number of components to be assembled during stack assembly is decreased by half. This reduces the number of components that must be handled and tracked during the stack assembly process, and consequently, the stack assembly time. The preassembled cell also allows for alternate cell stacking methods that may not be employed if the UEA and BPP are treated as separate components.

In addition, it is easier to control the alignment of the UEA and BPP while bonding them together to form the integrated fuel cell assembly than to control the alignment of each separate UEA and BPP in a stack of 200-300 cells. The bonding also prevents any shifting of the cell components relative to each other prior to applying the compressive load used to hold the stack together. The cell subassembly also allows the header features to be cut through the subgasket material after positioning and joining to the BPP. This reduces the amount of subgasket material overhanging the plate edge needed to insulate and prevent plate to plate shorting. It also increases the cross-sectional area available for reactant and coolant flows through the subgasket header openings.

Attaching the thin, weak subgasket material of the UEA to the rigid BPP creates a subassembly that can be readily handled and aligned as the stack is assembled without worrying about damaging the subgasket material.

The thermally activated adhesive acts as a low cost and robust seal material for the subgasket to the BPP interface. The adhesive does not rely completely on the compressive (elastomeric) material properties, which are subject to creep over the life of the stack and also to extreme conditions such as stack freeze where some elastomers can lose much of their resiliency.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A reinforced unitized electrode assembly comprising:
 a polymer membrane;
 an anode electrode and a cathode electrode on opposite sides of the polymer membrane;
 a pair of gas diffusion media on opposite sides of the polymer membrane, the gas diffusion media comprising a microporous layer and a gas diffusion layer, the anode electrode and the cathode electrode positioned between the polymer membrane and the pair of gas diffusion media;
 a subgasket positioned around a perimeter of one of the gas diffusion media, the subgasket defining an active area inside the perimeter, the subgasket having a layer of thermally activated adhesive thereon wherein the thermally activated adhesive has an operating temperature of between −30 and 100 degrees Celsius and pressures up to 300 kilopascal, and wherein the subgasket is made of a material selected from at least one of polyethylene naphthalate, polyimide, and polyether-etherketone;
 and
 a reinforcing feed shim providing structural support for the subgasket of the unitized electrode assembly and attached to the subgasket by the layer of the thermally activated adhesive.

2. The reinforced unitized electrode assembly of claim 1 wherein the thermally activated adhesive is ethylene vinyl acetate, ethylene acrylic acid, polyamide, polyesters, polyolefins, polyurethanes, or combinations thereof.

3. The reinforced unitized electrode assembly of claim 1 wherein the anode electrode and the cathode electrode are on the polymer membrane.

4. The reinforced unitized electrode assembly of claim 1 wherein the anode electrode and cathode electrode are on the microporous layer of the pair of gas diffusion media.

5. The reinforced unitized electrode assembly of claim 1 wherein the reinforcing feed shim is made of polyethylene naphthalate.

6. The reinforced unitized electrode assembly of claim 1 wherein the subgasket has an alignment hole.

7. The reinforced unitized electrode assembly of claim 1 wherein the anode electrode and the cathode electrode are on the microporous layer of the pair of gas diffusion media and wherein a bipolar plate is sealed to the subgasket on the cathode side.

8. The reinforced unitized electrode assembly of claim 1 wherein a bipolar plate is sealed to the subgasket on the anode side.

9. The reinforced unitized electrode assembly of claim 1 wherein a bipolar plate is sealed to the subgasket on the cathode side.

10. The reinforced unitized electrode assembly of claim 1 wherein the thermally activated adhesive fills a void formed in the active area at an edge of the subgasket.

* * * * *